(12) United States Patent
O'Connor et al.

(10) Patent No.: US 8,524,959 B1
(45) Date of Patent: Sep. 3, 2013

(54) BIOMASS CATALYTIC CONVERSION PROCESS AND APPARATUS FOR USE THEREIN

(75) Inventors: Paul O'Connor, Hoevelaken (NL); Henrique Soares Cerqueira, Rio de Janeiro (BR); Robert Bartek, Centennial, CO (US); Steve Yanik, Colorado Springs, CO (US)

(73) Assignee: KiOR, Inc., Pasadena, TX (US)

( * ) Notice: Subject to any disclaimer, the term of this patent is extended or adjusted under 35 U.S.C. 154(b) by 800 days.

(21) Appl. No.: 12/708,241

(22) Filed: Feb. 18, 2010

Related U.S. Application Data

(60) Provisional application No. 61/153,323, filed on Feb. 18, 2009.

(51) Int. Cl.
*C07C 1/00* (2006.01)

(52) U.S. Cl.
USPC ............... 585/240; 585/242; 201/31; 201/33

(58) Field of Classification Search
USPC ................. 585/240, 242; 422/139, 144, 145; 201/31, 33
See application file for complete search history.

(56) References Cited

U.S. PATENT DOCUMENTS

| | | | |
|---|---|---|---|
| 3,961,913 A | 6/1976 | Brenneman et al. | |
| 4,064,018 A | 12/1977 | Choi | |
| 4,147,593 A | 4/1979 | Frischmuth et al. | |
| 4,153,514 A | 5/1979 | Garrett et al. | |
| 4,266,083 A | 5/1981 | Huang | |
| 4,308,411 A | 12/1981 | Frankiewicz | |
| 4,711,873 A | 12/1987 | Suzukamo et al. | |
| 4,851,601 A | 7/1989 | Fukuda et al. | |
| 4,874,507 A | 10/1989 | Whitlock | |
| 4,987,114 A | 1/1991 | Suzukamo et al. | |
| 5,064,527 A | 11/1991 | Singhal et al. | |
| 5,097,088 A | 3/1992 | Fukao et al. | |
| 5,102,628 A | 4/1992 | De Lasa | |
| 5,115,084 A | 5/1992 | Himmelblau | |
| 5,233,109 A | 8/1993 | Chow | |
| 5,504,259 A | 4/1996 | Diebold et al. | |
| 5,599,510 A | 2/1997 | Kaminski et al. | |

(Continued)

FOREIGN PATENT DOCUMENTS

| | | |
|---|---|---|
| CA | 1283880 | 5/1991 |
| CA | 2618000 A1 | 2/2007 |

(Continued)

OTHER PUBLICATIONS

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002, pp. 2087-2095, XP004374414, ISSN: 0016-2361.

(Continued)

*Primary Examiner* — Nina Bhat
(74) *Attorney, Agent, or Firm* — Dunlap Codding, P.C.

(57) ABSTRACT

Disclosed is a process for small-scale operation of biomass catalytic cracking. The process is suitable for lab scale and pilot plant operation, as well as for small-scale commercial operation. The process is suitable for simulating a continuous biomass catalytic cracking (BCC) process. The process comprises a biomass conversion cycle and a catalyst regeneration cycle.

A fluid bed reactor and a reaction feed fluidizer suitable for use in the process are also disclosed.

23 Claims, 3 Drawing Sheets

(56) References Cited

U.S. PATENT DOCUMENTS

| | | | |
|---|---|---|---|
| 5,728,271 | A | 3/1998 | Piskorz et al. |
| 5,792,340 | A | 8/1998 | Freel et al. |
| 5,865,898 | A | 2/1999 | Holtzapple et al. |
| 5,959,167 | A | 9/1999 | Shabtai et al. |
| 5,961,786 | A | 10/1999 | Freel et al. |
| 6,022,419 | A | 2/2000 | Torget et al. |
| 6,069,012 | A | 5/2000 | Kayser |
| 6,248,297 | B1 | 6/2001 | Stine et al. |
| 6,485,774 | B1 | 11/2002 | Bransby |
| 6,814,940 | B1 | 11/2004 | Hiltunen et al. |
| 6,830,597 | B1 | 12/2004 | Green |
| 6,971,594 | B1 | 12/2005 | Polifka |
| 7,044,999 | B2 | 5/2006 | Bankstahl et al. |
| 7,202,389 | B1 | 4/2007 | Brem |
| 7,262,331 | B2 | 8/2007 | Van de Beld et al. |
| 7,288,685 | B2 * | 10/2007 | Marker ............... 585/240 |
| 7,341,973 | B2 | 3/2008 | Flego et al. |
| 7,503,981 | B2 | 3/2009 | Wyman |
| 8,003,835 | B2 * | 8/2011 | Yanik et al. ............ 585/240 |
| 8,057,641 | B2 * | 11/2011 | Bartek et al. ............ 201/12 |
| 2004/0180971 | A1 | 9/2004 | Inoue et al. |
| 2005/0145542 | A1 | 7/2005 | O'Connor et al. |
| 2007/0000177 | A1 | 1/2007 | Hippo et al. |
| 2007/0213573 | A1 | 9/2007 | Ross et al. |
| 2008/0009055 | A1 | 1/2008 | Lewnard |
| 2009/0013601 | A1 | 1/2009 | Mandich et al. |
| 2009/0093555 | A1 | 4/2009 | Stites et al. |
| 2009/0139851 | A1 | 6/2009 | Freel |
| 2009/0165378 | A1 | 7/2009 | Agblevor |
| 2009/0227823 | A1 | 9/2009 | Huber et al. |

FOREIGN PATENT DOCUMENTS

| | | |
|---|---|---|
| DE | 202006012176 | 12/2006 |
| EP | 1719811 A1 | 11/2006 |
| EP | 1852466 A1 | 11/2007 |
| EP | 1852490 A1 | 11/2007 |
| EP | 1852492 A1 | 11/2007 |
| EP | 1878783 A1 | 1/2008 |
| EP | 2105486 A1 | 9/2009 |
| EP | 2107100 A1 | 10/2009 |
| WO | WO81/01713 A1 | 6/1981 |
| WO | WO02/14040 A1 | 2/2002 |
| WO | WO02/083816 A1 | 10/2002 |
| WO | WO2006/117006 A1 | 11/2006 |
| WO | WO2007/128798 A1 | 11/2007 |
| WO | WO2007/128799 A1 | 11/2007 |
| WO | WO2007/128800 A1 | 11/2007 |
| WO | WO2008/009643 A2 | 1/2008 |
| WO | WO2008/011598 A2 | 1/2008 |
| WO | WO2008/101949 A1 | 8/2008 |
| WO | WO2009/118352 A1 | 10/2009 |
| WO | WO2009/143017 A1 | 11/2009 |
| WO | WO2010/002792 A2 | 1/2010 |

OTHER PUBLICATIONS

Huber, George, W., et al. "Synthesis of Transportation Fuels From Bomass: Chemistry, Catalysts and Engineering" Chem.Rev.,; Chemical Reviews, Sep. 2006, vol. 106, No. 9, pp. 40-44-4098, 4047-4048, 4061-4063, 4085, 4092-4093, XP002490759.

McKendry, P., "Energy Production From Biomass," Bioresource Technology 83 (2002) p. 37-46.

Wyman, et al, "Coordinated Development of Leading Biomass Pretreatment Technologies" Bioresource Technology 96 (2005) 1959-1966.

Bridgwater, A.V. "Principles and Practice of Biomass Fast Pyrolysis Processes for Liquids" Journal of Analytical and Applied Pyrolysis, Jul. 1999 vol. 51, pp. 3-22, p. 15, para 4 to p. 16 para 2; p. 18, para 2.

Bridgwater, A.V., et al, "Fast Pyrolysis Processes for Biomass," Renewable and Sustainable Energy Reviews 4 (2000) 1-73.

* cited by examiner

US 8,524,959 B1

BIOMASS CATALYTIC CONVERSION PROCESS AND APPARATUS FOR USE THEREIN

BACKGROUND OF THE INVENTION

1. Field of the Invention

The invention relates generally to a cyclic process for the catalytic conversion of biomass. The process lends itself for operation on a commercial scale, as well as on pilot plant and laboratory scale. The invention further relates to an apparatus in which the simulated process can be carried out.

2. Description of the Related Art

Catalytic processes have been proposed for the catalytic conversion of biomass to, for example, liquid products such as bio-oil. Fluid bed processes are among the processes that have been proposed. Preferred prior art processes are continuous processes. Such processes have many advantages, but are not suitable for short reaction runs, as it takes some time for the reaction conditions of a continuous process to reach steady state. Also, the reaction equipment required for continuous processes is by necessity relatively large, making it less suitable for a distributed process whereby biomass conversion is carried out in close proximity of the biomass harvest site.

Accordingly, there is a need for a catalytic biomass conversion process that can be carried out in batch mode, requiring relatively small reaction equipment as compared to the equipment required for continuous processes.

There is a further need for a laboratory-scale or pilot plant scale process and apparatus in which a fluid catalytic pyrolysis process for the conversion of solid biomass material can be simulated. There is a particular need for simulating such processes on a laboratory scale, preferably requiring only gram quantities of biomass material.

Small-scale processes have been developed for simulating fluid catalytic cracking ("FCC") of crude oil fractions. Several of these processes are operated in batch mode. The most commonly used batch process for simulating FCC is the so-called micro-activity test ("MAT"). This test is described in ASTM D-3907-86. Being a batch process MAT differs in many crucial ways from the commercial, full-scale FCC process. As a consequence, MAT's utility in predicting selectivities and yields obtained in a full-scale FCC unit are limited.

U.S. Pat. No. 5,102,628 to De Lasa discloses a "riser simulator" designed to make it possible to use a catalyst-to-oil ratio corresponding with the standard catalyst-to-oil ratio used in conventional riser reactors. The reactor can only be used for fluid feedstocks.

U.S. Pat. No. 6,069,012 to Kayser discloses a laboratory scale fluid catalytic cracking apparatus designed to emulate commercial riser cracking. The apparatus includes a reactor having a removable feed injector to facilitate changing quickly hydrocarbon contact time without varying the feed rate, diluent rates, or catalyst charge.

US Patent Application Publication 2005/0145542 discloses a cyclic process for testing FCC catalysts with resid feedstock on a small scale. In a first cycle the feed to be cracked is heated to a temperature between 50 and 500° C. The heated feed is injected into a riser reactor containing the FCC catalyst to be tested having a temperature between 500 and 800° C. An inert gas is injected into the lower end of the riser in the vicinity of the feed injection point. The feed is hereby contacted with the FCC catalyst under fluidized conditions. The feed is stripped from the FCC catalyst and the reaction product is analyzed. In a second cycle a quench liquid is injected into the riser reactor.

The small-scale processes that have been developed for emulating FCC are designed to handle liquid feedstocks.

Thus, there is a particular need for a small-scale process that reliably emulates fluid catalytic cracking of solid biomass materials. The process should be suitable for lab-scale and for pilot plant scale operation, as well as for small-scale commercial operation.

BRIEF SUMMARY OF THE INVENTION

The present invention addresses these problems by providing a cyclic process for simulating a continuous biomass catalytic cracking reaction, said process comprising (i) a biomass conversion cycle comprising contacting a stream of solid biomass particles in a carrier gas with a fluidized catalyst bed; and (ii) a catalyst regeneration cycle comprising contacting the catalyst bed with an oxygen containing gas at a temperature in the range of 500 to 800° C. The invention also provides a feed fluidizer for feeding biomass into the reactor.

Another aspect of the invention comprises an apparatus for carrying out the process. The apparatus comprises a fluid bed reactor having, in the small-scale version, a removable top head, and a conical bottom head. The apparatus may further comprise a reaction feed fluidizer.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

The invention relates to a cyclic process for the catalytic conversion of solid biomass material. The process comprises at least the cycles of (i) a biomass conversion cycle comprising contacting a stream of solid biomass particles in a carrier gas with a fluidized catalyst bed; and (ii) a catalyst regeneration cycle comprising contacting the catalyst bed with an oxygen containing gas at a temperature in the range of 500 to 800° C.

In a preferred embodiment the biomass conversion cycle is preceded by a biomass/carrier gas mixing step, during which biomass particles are mixed with an inert carrier gas. Optionally the premix is heated to a temperature between ambient and 150° C. prior to the biomass conversion cycle.

The biomass feedstock is preferably brought into intimate contact with a portion of the catalyst even prior to the biomass/carrier gas mixing step. This biomass/catalyst premixing step can involve mechanical treatment, such as co-milling, co-grinding, co-kneading, and the like. The pre-mixing step can further comprise mild heating of the biomass, generally to a temperature of 150° C. or below, for example a temperature in the range of 90 to 150° C.

In another embodiment a stripping cycle is carried out between the conversion cycle and the regeneration cycle. The purpose of the stripping cycle is to remove valuable reaction products from the catalyst prior to the regeneration cycle, thereby preventing loss of these reaction products due to combustion during the regeneration cycle. The stripping cycle is generally carried out at a temperature which is higher than the conversion temperature, and lower than the regeneration temperature. Suitably the stripping cycle is carried out at a temperature in the range of from 450 to 600° C. During the stripping cycle the catalyst is purged with an inert gas.

As indicated hereinabove, the cyclic process is suitable for operation on a commercial scale, as well as for pilot plant scale and laboratory scale operation. In particular in a commercial scale operation, and to a lesser extent in a pilot plant scale operation, it is desirable to recover heat generated during the regeneration step, and to recycle the recovered heat to other cycles of the process.

The cyclic process may be carried out in a single reactor, or in a series of reactors. Both embodiments will be illustrated below for the preferred process in which biomass is pre-mixed with catalyst material, and in which a stripping cycle is carried out between the conversion cycle and the regeneration cycle.

Figure 1:
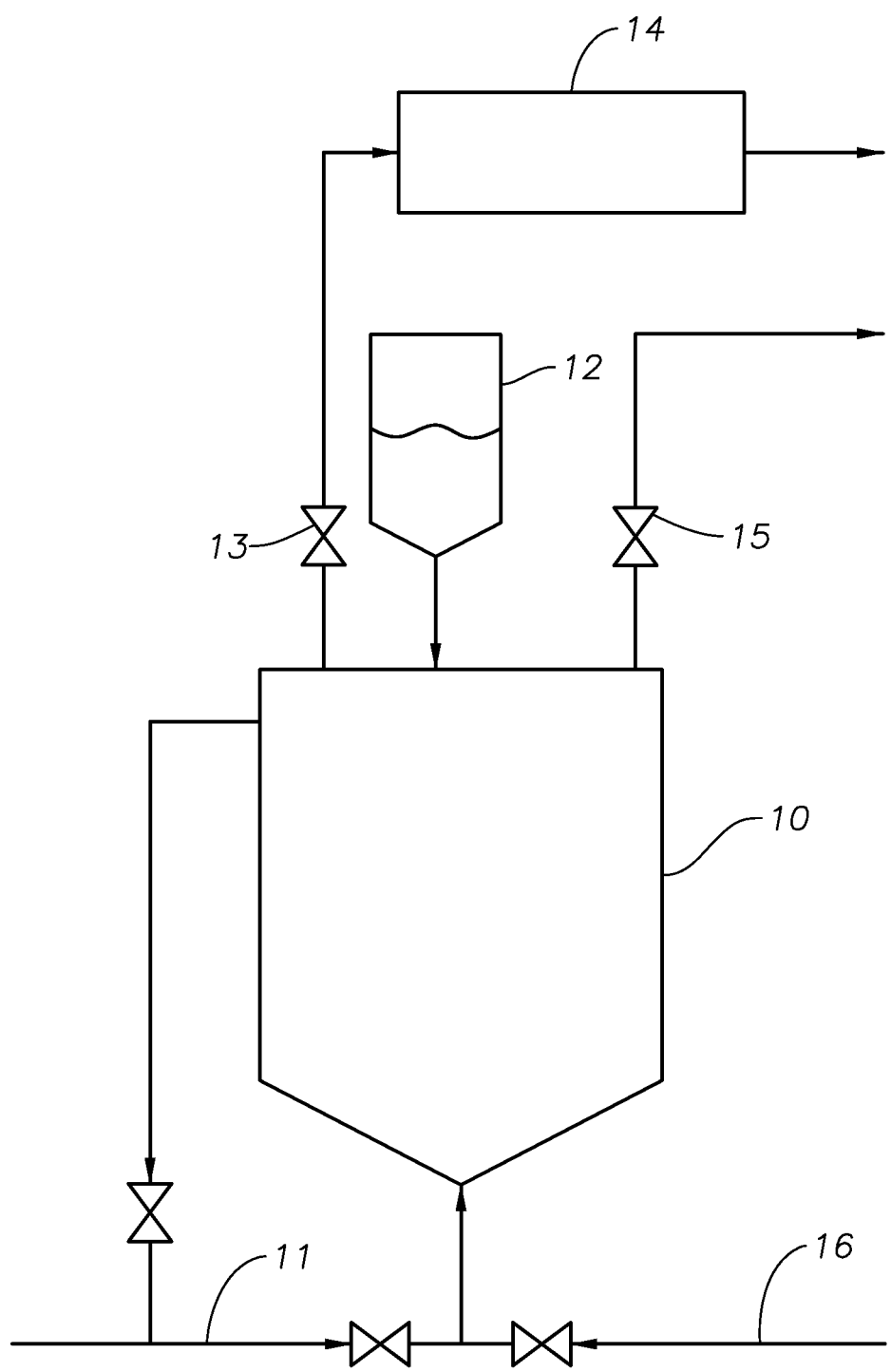
FIG. 1 is a schematic representation of a single-reactor system for implementing the process of the invention.

FIG. 1 shows a schematic representation of the single-reactor embodiment. Prior to the conversion cycle reactor 10 is charged with the appropriate amount of catalyst, which is kept fluidized by inert gas flow 11. The catalyst may be hot catalyst from the previous regeneration cycle, or it may be cold catalyst from a different source. The catalyst is brought to the desired temperature by cooling or heating, using steam coils (not shown) provided in reactor 10.

Biomass/catalyst pre-mix from hopper 12 is introduced into reactor 10 by gravity flow. Alternate embodiments effect feedstock introduction by means of a pressure surge (such as a lock hopper), a syringe, or a screw feeder. Once the biomass/catalyst pre-mix reaches the hot (e.g., about 500° C.) fluid bed it rapidly heats to the desired conversion temperature, for example 450° C. As the reaction conditions mimic those of a fluid catalytic cracking (FCC) riser, the reaction time should be kept short, generally in the range from 0.5 seconds to 120 seconds, preferably from 2 to 45 seconds.

After the desired reaction time is completed, any gaseous and vaporized reaction products are removed from reactor 10 by opening valve 13 so that gaseous and vaporized reaction products are transported to condenser 14 by lift gas 11. Condensable gases are separated from non-condensable gases in condenser 14. The fluid bed is quickly heated to a stripping temperature of, for example, about 600° C. so that most of reaction products become vaporized and are purged from reactor 10.

The stripping cycle may be continued for any length of time considered suitable for removing reaction products from the catalyst particles. Progress of the stripping process may be monitored by analyzing the gas leaving reactor 10 via valve 13. In commercial processes the stripping time represents a trade-off between the incremental collection of reaction products and the need to free up the reactor for the next run. In experimental operations such a trade-off typically does not exist, and the operator of the equipment may choose to continue the stripping cycle for as long as valuable compounds are being stripped from the catalyst.

The regeneration cycle is initiated by closing valve 13, opening valve 15, switching off inert gas flow 11, and switching on oxidizing gas flow 16. Oxidizing gas 16 may be air, oxygen, or any other oxygen-containing gas. During the regeneration cycle deposits of coke, char and any tar, remaining on the catalyst after the stripping cycle, is burned off. The regeneration is an exothermic reaction. The temperature of the fluid bed is allowed to rise to the appropriate regeneration temperature, for example 700° C. Overheating is prevented by cooling, using the earlier mentioned steam coils. Steam generated during the regeneration cycle is stored, and may be used for supplying heat to subsequent conversion and stripping cycles.

Gaseous combustion products, primarily CO and CO2, leave reactor 10 via valve 15. The CO/CO2 ratio of the flue gas is determined largely by the oxygen content of oxidizing gas 16, and the regeneration temperature. Operating the regeneration cycle with a substoechiometric amount of oxygen favors the formation of CO, whereas stoechiometric and super-stoechiometric amounts of oxygen favor the formation of CO2. CO may be used in the process for its reducing properties. For example, inert gas flow 11 may be replaced with a CO-containing gas, for example a mixture of nitrogen and CO, in order to reduce the oxygen content of the resulting biomass conversion products.

CO2 produced during the regeneration cycle may be used in growing plants, for example by feeding it into greenhouses or algae ponds. The skilled person will appreciate that the CO2 formed in the regenerator may be released into the atmosphere without creating a greenhouse burden, as it originates from a biomass source.

After completion of the regeneration cycle the flow of oxidizing gas 16 is switched off, and inert gas flow 11 is switched back on. The catalyst in reactor 10 is cooled off to the desired temperature, e.g., about 500° C., to prepare the reactor for the next conversion cycle.

Figure 2:
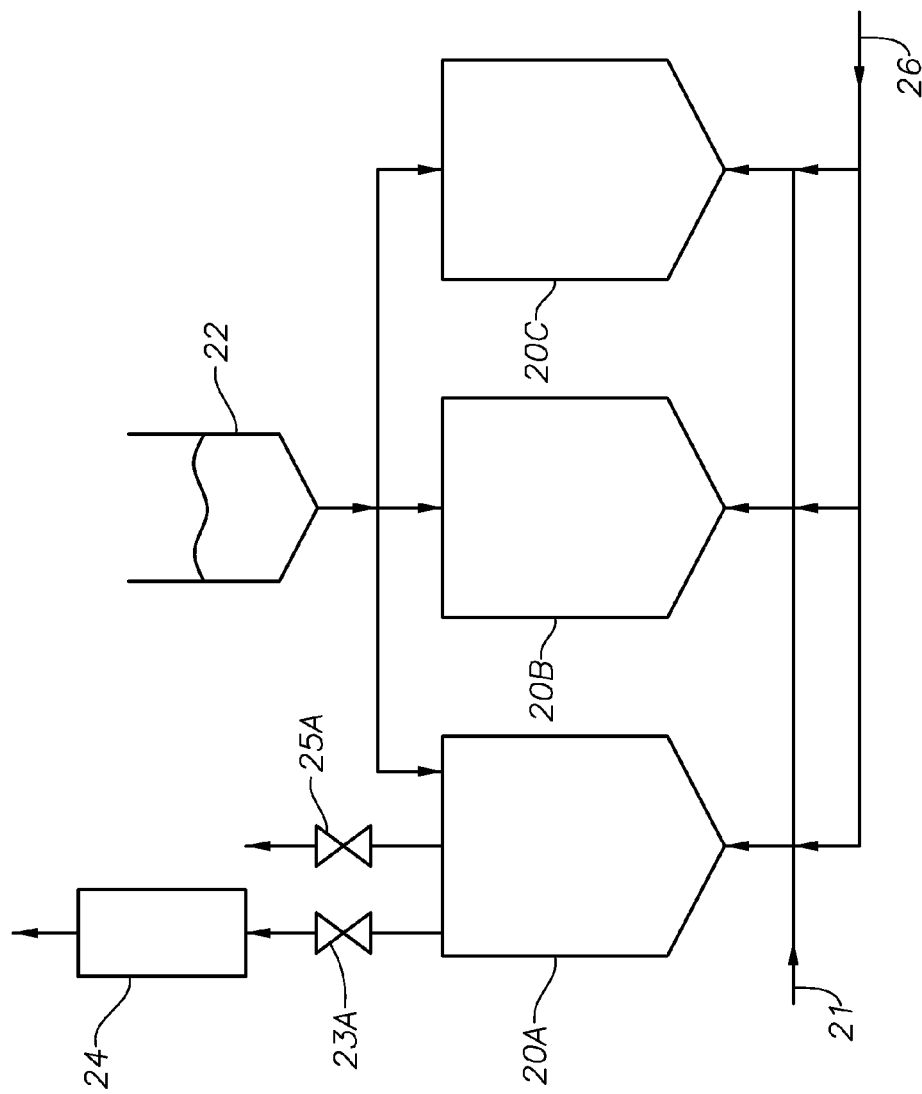
FIG. 2 is a schematic representation of a multiple-reactor system for implementing the process of the invention.

FIG. 2 is a schematic representation of another embodiment of a reactor system. The system comprises a plurality of reactors, represented by reactors 20A, 20B, and 20C. By way of example, reactor 20A is in the conversion cycle. It contains a fluidized bed of hot catalyst particles of a predetermined temperature, chosen so as to provide the desired conversion temperature upon mixing with the biomass/catalyst pre-mix contained in hopper 22. Reactor 20A receives a fluidizing inert gas flow 21. Reaction products from reactor 20A are sent to condenser 24 via valve 23A.

Meanwhile reactor 20B is in the stripping cycle. It receives inert stripping gas 21, and vaporized reaction products are sent to condenser 24 via a valve 23B (not shown). At the same time reactor 20C is in the regeneration cycle. It receives oxidizing gas 26, and releases flue gases (primarily CO and CO2) via a valve 25C (not shown).

After the conversion cycle in reactor 20A is completed, this reactor switches to the stripping cycle. Likewise, upon completion of the stripping cycle in reactor 20B, this reactor switches to the regeneration cycle. Upon completion of the regeneration cycle in reactor 20C, this reactor switches to the conversion cycle. While reactor 20C is in the regeneration cycle, it can supply heat to the conversion cycle in reactor 20A, and to the stripping cycle in reactor 20B. Once reactor 20B is switched over to the regeneration cycle, it starts supplying heat to the stripping cycle in reactor 20A, and to the conversion cycle in reactor 20C.

It will be understood that variations on the multi-reactor system of FIG. 2 are possible. For example, the system may comprise 5 or 6 reactors, so that at any given point of time 3 or 4 reactors of the system are in the conversion cycle, whereas only one reactor is in the stripping cycle, and the remaining reactor is in the regeneration cycle. Such an arrangement is possible, because the conversion cycle is much shorter than the stripping cycle and the regeneration cycle, respectively.

In another variation of the system of FIG. 2, each reactor is kept constantly in the same cycle. In other words, at least one reactor of the system is dedicated to the conversion cycle; at least one other reactor is dedicated to the stripping cycle; and at least one reactor is dedicated to the regeneration cycle. Biomass and catalyst are conveyed through the system, first entering the conversion reactor, then the stripping reactor, and finally the regeneration reactor. This semi-continuous process preserves most of the advantages of the batch-type process of the invention.

In another aspect, the present invention relates to a small-scale, preferably lab-scale, process simulating what has been referred to as a biomass catalytic cracking ("BCC") process. The essential characteristic of any BCC process is that biomass particles are contacted with a fluid bed of particles of a catalytic material and/or a heat transfer medium, at elevated temperature. The term "biomass particles" as used herein refers to both droplets of a liquid biomass material (such as a bio-oil) and to particles of a solid biomass material. The term "solid biomass particles" does not encompass liquid biomass material.

Although in some ways similar to the standard fluid catalytic cracking ("FCC") process used in refineries for cracking crude oil fractions, the BCC process differs from the FCC process in several significant respects. Firstly, the feed used in a BCC process does not readily evaporate upon entering the fluid bed reactor. Specifically, when a solid biomass feed is used, no vapors are formed until after the biomass has begun to be converted. Secondly, even "dry" biomass material generally contains some residual water. This water evaporates upon entry into the fluidized bed reactor, thereby withdrawing heat from the fluidized bed.

It will be understood that the heat transfer, the mass transfer and the diffusion behavior in a BCC process are all very different from those in an FCC process. The process of the invention is designed to properly emulate the heat transfer, mass transfer and diffusion limitations of a BCC process.

In its essence, the process of the invention is a cyclic process comprising (i) a biomass conversion cycle comprising contacting a stream of solid biomass particles in a carrier gas with a fluidized catalyst bed; and (ii) a catalyst regeneration cycle comprising contacting the catalyst bed with an oxygen containing gas at a temperature in the range of from 500 to 800° C.

Unless otherwise specified, the term "catalyst" as used herein encompasses both catalytic materials and inert, solid heat transfer mediums, such as sand particles. In other words, the process of the invention may be used to study the thermal decomposition of biomass, the catalytic conversion of biomass, and the catalytic conversion of biomass whereby catalyst particles are mixed with a particulate heat transfer medium, such as sand.

The feed of solid biomass particles is introduced into the biomass conversion cycle in the form of a fluid stream of solid biomass particles entrained in a flow of inert gas. The term "inert gas" as used herein refers to a gas that is substantially free of molecular oxygen. Examples include nitrogen, a noble gas, such as helium or argon, and steam. Accordingly, the process preferably contains a biomass mixing step, preceding the biomass conversion cycle, during which biomass material particles are mixed with an inert carrier gas.

The biomass conversion cycle takes place in a fluid bed reactor. The amount of catalyst in the fluidized bed reactor is such that the catalyst bed is readily fluidized. The conditions for fluidization have been extensively studied in the context of FCC processes, the results of those studies being directly applicable here. The amount of biomass to be introduced into the biomass conversion cycle is such that the catalyst-to-biomass ratio is in the range of from 2 to 80. It will be understood that the process lends itself to the specific study of varying catalyst-to-biomass ratios. It is desirable to minimize the time needed for introducing the stream of solid biomass particles into the fluid bed reactor. In general, this time should be less than 1 minute.

In most cases the biomass conversion cycle is carried out at a temperature in the range of from about 250° C. to about 600° C., preferably in the range of from about 350° C. to about 550° C. It will be understood that the process lends itself to the specific study of varying conversion temperatures, in which case temperatures outside of these ranges may be employed.

In a particularly preferred embodiment the biomass conversion cycle comprises a first conversion step conducted at a first temperature in the range of from 150 to 400° C., and a second conversion step conducted at a second temperature in the range of from 350 to 500° C. In this embodiment the second temperature preferably is higher than the first temperature. It is further preferred to have a reaction time of the first step that is longer than the reaction time of the second step. More preferred is a two-step biomass conversion cycle wherein the reaction time of the first step is at least twice the reaction time of the second step.

If a two-step conversion is carried out, it is desirable to remove reaction products from the catalyst bed between the first step and the second step, by stripping the catalyst with an inert gas. The reaction products may be passed through a condenser, and their composition analyzed, for example in a gas-liquid chromatographic (GLC) analysis.

Introduction of the solid biomass particles into the fluidized bed reactor has a cooling effect on the catalyst particles present in the fluidized bed reactor. This cooling effect is particularly pronounced if the solid biomass particles contain large amounts of water, e.g. higher than 10 wt % and/or if low catalyst-to-biomass ratios are employed. It may be desirable to heat the biomass particles during the biomass mixing step to a temperature between ambient and 150° C., preferably between ambient and 100° C.

In general the process is operated such that the biomass particles and the catalyst have a contact time of from 0.5 seconds to 120 seconds.

Cycles (i) and (ii) may both be carried out in the same fluid bed reactor. This reactor preferably has a removable top head. Although catalyst material can be introduced into, and removed from, a fluid bed reactor using an appropriate conduit, it may be desirable to open the reactor and scoop out the catalyst. This may be necessary if certain experimental reaction conditions lead to the formation of excessive amounts of coke or char. The removable head makes it possible to remove caked catalyst mass without having to burn off the coke or char. This makes it possible also to conduct chemical and physical analyses on the spent catalyst and/or char.

Desirably the fluid bed reactor further comprises a porous, plate at the bottom of its cylindrical section to ensure a good fluidization from the bottom. Also, a conical bottom head can be applied. The shape of the conical bottom head facilitates the fluidization of the catalyst bed. In addition the fluid bed reactor may be provided with a heat source designed and configured to maintain the catalyst bed at a predetermined temperature. Such heat sources are known in the art. For this purpose it is desirable to provide temperature sensors at appropriate locations inside the fluid bed reactor.

Desirably the catalyst bed is stripped with an inert gas after completion of the biomass conversion cycle and before the start of the catalyst regeneration cycle. The reaction products may be passed through a condenser, during the biomass conversion cycle, during any stripping step, or both. Condensed reaction products can be analyzed separately.

Non-condensable gases present in the reaction product can be recycled back into the next biomass conversion cycle. Samples can be taken for analysis.

The biomass mixing step can be carried out in a reaction feed fluidizer. Generally the reaction feed fluidizer comprises a vessel with a removable top head, a gas inlet for introducing an inert gas, and a fluidized feed outlet. Suitably the fluidized feed outlet is connected to the reaction feed inlet of the fluidized bed reactor.

Optionally the reaction feed fluidizer is provided with a heat source designed and configured for maintaining a predetermined temperature in the reaction feed fluidizer. The reaction feed fluidizer is designed to maintain a pressure up to 15 psi. Feeding the biomass/catalyst mixture at pressures above atmospheric can ease mixing in the reactor.

The reaction feed fluidizer can further comprise an inlet for a liquid solvent or diluent, so that such a liquid can be added to the reaction feed, if desired.

Figure 3:
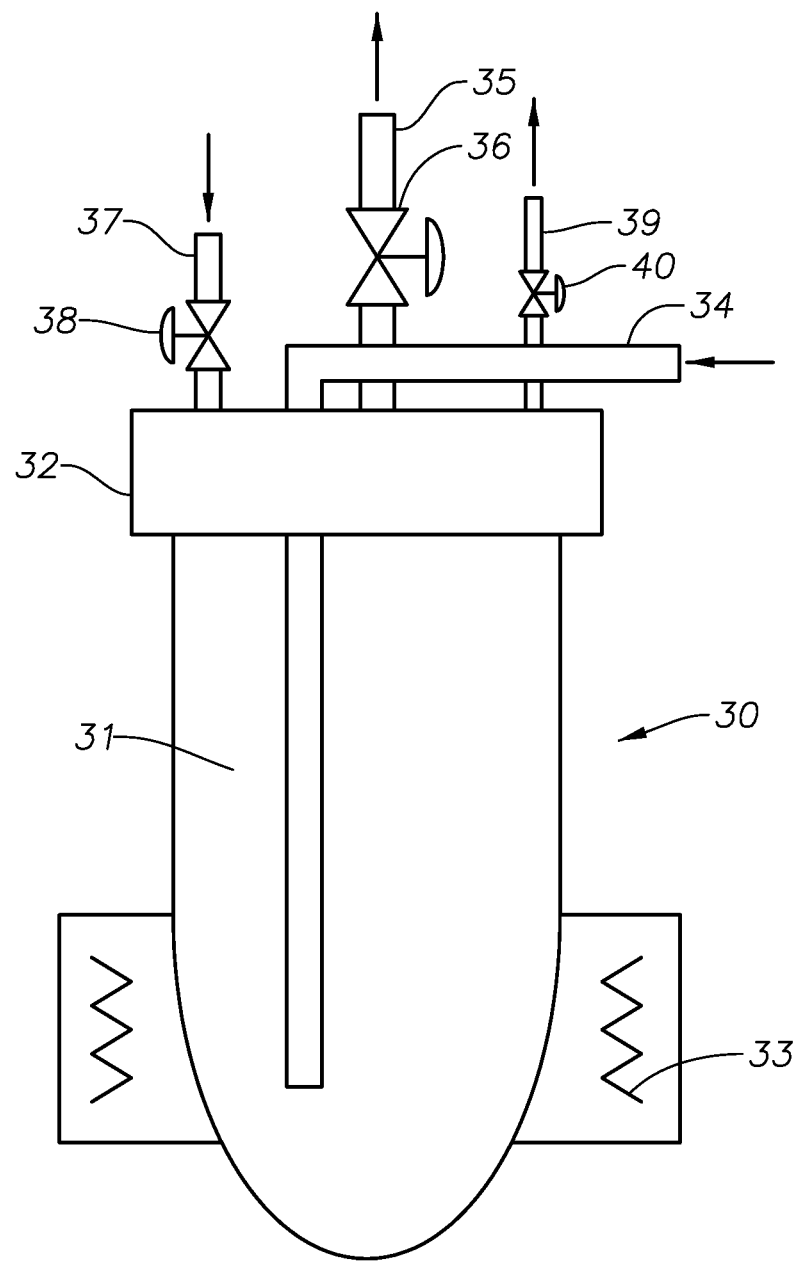
FIG. 3 is a sectional view of a fluid bed reactor suitable for use in the process of the invention.

FIG. 3 is a schematic representation of a fluid bed reactor suitable for use in the process of the invention.

Reaction feed fluidizer 30 comprises a vessel 31, which is capped with a removable top head 32. Prior to positioning top head 32 on top of vessel 31, the desired amount of solid particulate biomass material is placed in vessel 31. The catalyst particles may be heated to a predetermined temperature by means of heat source 33. Inert gas is introduced into vessel 31 through inlet 34, which opens near the bottom of vessel 31. When inert gas is introduced into inlet 34, biomass particles become mixed with the inert gas. The inert gas/biomass mixture leaves feed fluidizer 30 via outlet 35, which may be closed of by means of valve 36.

Top head 32 is further provided with inlet 37, through which a solvent or diluents may be introduced into vessel 31. Inlet 37 may be closed by means of valve 38.

Top head 32 is further provided with vent 39, which may be closed by means of valve 40.

The device of FIG. 3 can also be used as a feed fluidizer. It is desirable to place the feed fluidizer above the reactor (for example, on top of the reactor) so that the feed line from the fluidizer to the reactor is directed downwardly. Preferably the feed line is jacketed and cooled, for example with a liquid, such as water, or a gas, such as nitrogen or helium.

The reaction feed fluidizer is particularly suitable for use in a laboratory scale reactor system.

While the technology has been particularly shown and described with reference to specific embodiments, it should be understood by those skilled in the art that various changes in form and detail may be made without departing from the spirit and scope of the technology as defined by the appended claims.

What is claimed is:

1. A cyclic process for catalytically converting a solid particulate biomass material, said process comprising (i) a biomass conversion cycle comprising contacting a stream of solid biomass particles with a fluidized catalyst bed; and (ii) a catalyst regeneration cycle comprising contacting said fluidized catalyst bed with an oxygen containing gas at a temperature in the range of from about 500 to about 800° C.

2. The process of claim 1 further comprising a stripping cycle, carried out after said biomass conversion cycle and before said catalyst regeneration cycle.

3. The process of claim 1 wherein the catalyst-to-biomass ratio during said biomass conversion cycle is in the range of from 2 to 80.

4. The process of claim 1 wherein said biomass conversion cycle is carried out at a temperature in the range of from about 250° C. to about 600° C.

5. The process of claim 1 wherein said biomass conversion cycle is carried out at a temperature in the range from about 350° C. to about 550° C.

6. The process of claim 1 wherein said biomass conversion cycle is preceded by a biomass mixing step, during which said solid biomass particles are mixed with an inert carrier gas.

7. The process of claim 6 wherein said solid biomass particles are heated during said biomass mixing step to a temperature between ambient and about 150° C.

8. The process of claim 6 wherein said solid biomass particles are heated during said biomass mixing step to a temperature between ambient and about 100° C.

9. The process of claim 1 wherein said solid biomass particles and said catalyst have a contact time of from about 0.5 seconds to about 120 seconds.

10. The process of claim 1 wherein cycles (i) and (ii) are carried out in a fluid bed reactor having a removable top head.

11. The process of claim 10 wherein said fluid bed reactor further comprises a conical bottom head or a porous plate at the end of the cylindrical portion for fluidization from the bottom.

12. The process of claim 10 wherein said fluid bed reactor is provided with a heat source designed and configured to maintain said fluidized catalyst bed at a predetermined temperature.

13. The process of claim 1 wherein said fluidized catalyst bed is stripped with an inert gas at a point in time which is after said biomass conversion cycle and before said catalyst regeneration cycle.

14. The process of claim 13 wherein reaction products are passed through a condenser during said biomass conversion cycle and/or during said stripping step.

15. The process of claim 14 wherein uncondensed gases from said condenser are recycled at least in part to said biomass conversion cycle.

16. The process of claim 1 wherein said biomass conversion cycle comprises a first conversion step conducted at a first temperature in the range of from about 150 to about 400° C. and a second conversion step conducted at a second temperature in the range of from about 350 to about 500° C., whereby said second temperature is higher than said first temperature.

17. The process of claim 16 wherein the reaction time of said first conversion step is longer than the reaction time of said second conversion step.

18. The process of claim 16 wherein the reaction time of said first conversion step is at least twice the reaction time of said second conversion step.

19. The process of claim 16 whereby reaction products are stripped off the catalyst after said first conversion step and before said second conversion step.

20. The process of claim 6 wherein said biomass mixing step is carried out in a reaction feed fluidizer comprising a removable top head, a gas inlet, and a fluidized feed outlet.

21. The process of claim 20 wherein said reaction feed fluidizer further comprises a heat source designed and configured for maintaining a predetermined temperature in said reaction feed fluidizer.

22. The process of claim 20 wherein said biomass particles are loaded into said reaction feed fluidizer by gravity, by pressure surge, by means of a syringe, or by means of a screw feeder.

23. The process of claim 20 wherein said reaction feed fluidizer further comprises an inlet for introduction of a liquid solvent or diluent.

* * * * *